(12) United States Patent
Chen et al.

(10) Patent No.: US 10,147,048 B2
(45) Date of Patent: Dec. 4, 2018

(54) STORAGE DEVICE LIFETIME MONITORING SYSTEM AND STORAGE DEVICE LIFETIME MONITORING METHOD THEREOF

(71) Applicant: Wistron Corporation, New Taipei (TW)

(72) Inventors: Chih-Ming Chen, New Taipei (TW); Victor Chang, New Taipei (TW)

(73) Assignee: Wistron Corporation, New Taipei (TW)

( * ) Notice: Subject to any disclaimer, the term of this patent is extended or adjusted under 35 U.S.C. 154(b) by 615 days.

(21) Appl. No.: 14/719,319

(22) Filed: May 22, 2015

(65) Prior Publication Data
US 2016/0232450 A1 Aug. 11, 2016

(30) Foreign Application Priority Data
Feb. 5, 2015 (TW) .............................. 104103877 A

(51) Int. Cl.
*G06F 11/00* (2006.01)
*G06N 99/00* (2010.01)

(52) U.S. Cl.
CPC ........... *G06N 99/005* (2013.01); *G06F 11/00* (2013.01)

(58) Field of Classification Search
CPC ...................... G06N 99/005; G06F 17/30312
See application file for complete search history.

(56) References Cited

U.S. PATENT DOCUMENTS

| 5,950,147 | A | * | 9/1999 | Sarangapani | ...... | G05B 23/0232 |
|           |   |   |        |             |        | 701/1 |
| 9,542,296 | B1 | * | 1/2017 | Engers | ................ | G06F 11/3452 |
| 2007/0266200 | A1 | * | 11/2007 | Gorobets | .............. | G06F 11/008 |
|              |    |   |         |          |              | 711/103 |

(Continued)

FOREIGN PATENT DOCUMENTS

WO 2014051603 4/2014

OTHER PUBLICATIONS

"Office Action of China Counterpart Application," dated Jan. 29, 2018, p. 1-p. 8, English annotation only and list of cited references.

*Primary Examiner* — Scott A. Waldron
*Assistant Examiner* — Oluwatosin O Alabi
(74) *Attorney, Agent, or Firm* — JCIPRNET

(57) ABSTRACT

A storage device lifetime monitoring system for monitoring lifetimes of storage devices and a storage device lifetime monitoring method thereof are provided. The method includes collecting operation activity information corresponding to the storage devices; storing multiple training data having the operation activity information and corresponding operation lifetime values; constructing a storage device lifetime predicting model according to the operation activity information and the corresponding operation lifetime values of the training data; inputting the operation activity information of the storage devices into the storage device lifetime predicting model to generate a predicted lifetime value corresponding to each of the storage devices; and re-constructing the storage device lifetime predicting model according to operation activity information and predicted lifetime value of each storage device. Thereby, the lifetime of storage devices can be accurately predicted.

14 Claims, 5 Drawing Sheets

(56) References Cited

U.S. PATENT DOCUMENTS

| | | | | |
|---|---|---|---|---|
| 2013/0227352 A1* | 8/2013 | Kumarasamy | ...... | G06F 11/3072 714/47.1 |
| 2014/0181595 A1* | 6/2014 | Hoang | ................ | G06F 11/3034 714/47.3 |
| 2015/0205657 A1* | 7/2015 | Clark | .................... | G06F 11/008 714/47.3 |
| 2015/0281015 A1* | 10/2015 | Griffith | .............. | H04L 43/0817 709/224 |
| 2016/0055044 A1* | 2/2016 | Kawai | ................. | G06N 99/005 714/26 |

* cited by examiner

STORAGE DEVICE LIFETIME MONITORING SYSTEM AND STORAGE DEVICE LIFETIME MONITORING METHOD THEREOF

CROSS-REFERENCE TO RELATED APPLICATION

This application claims the priority benefit of Taiwan application serial no. 104103877, filed on Feb. 5, 2015. The entirety of the above-mentioned patent application is hereby incorporated by reference herein and made a part of this specification.

BACKGROUND

Field of the Invention

The present invention is directed to a storage device lifetime monitoring system and more particularly, to a storage device lifetime monitoring system and a storage device lifetime monitoring method thereof for monitoring a plurality of storage devices of a data center.

Description of Related Art

In recent years, with the continuous progress of the technologies, the significant increase in the amount of data has brought the technology industry with influence on demands of data storage hardware. Because the large-volume data needs to be stored by using a plurality of non-volatile storage devices, sizes of the capacities of the storage devices and complexity of managing the storage devices are correspondingly increased.

Generally, in order to manage an operation situation of a data center for security maintenance, when a server system for managing the data center is developed and designed, a management module is usually configured to monitor internal information of a system, such as a fan operation condition, a temperature or a voltage. Thereby, the server system can passively take actions, such as data restore or hardware replacement, after a report (e.g., a log file corresponding to each storage device) with respect to abnormal states of each storage device in the system is received.

Due to the large capacity of each storage device in the data center, after a storage device is damaged (or encounters a serious error), a duration required for recovering the damaged storage device or backing up the data is significantly increased, which leads to dramatic increase of maintenance cost for the data center. However, along with the development of the trend toward high-speed data accessing, the data center also introduces with storage devices (e.g., solid-state disks (SSD) capable of high-speed data accessing) rather than the conventional hard disks (HDD) for storing data. Therefore, the convention self-monitoring analysis and report technique that is merely adapted for the conventional HDDs cannot satisfy various kinds of maintenance needs of the storage devices of the data center. Accordingly, how to accurately predict lifetimes of the storage devices, actively predict the lifetimes of the storage devices in advance and take preventive actions to save numerous maintenance cost caused by device damages has become a target for the persons of the art to make effort to.

SUMMARY

The present invention provides a storage device lifetime monitoring system and a storage device lifetime monitoring method thereof, capable of effectively predicting lifetimes of storage devices.

According to an exemplary embodiment of the present invention, a storage device lifetime monitoring system for monitoring lifetimes of a plurality of storage devices is provided. The storage device lifetime monitoring system includes a storage device detecting and analyzing module, a database, a lifetime estimation training module and a lifetime predicting module. The database is coupled to the storage device detecting and analyzing module. The lifetime estimation training module is coupled to the storage device detecting and analyzing module. The lifetime predicting module is coupled to the storage device detecting and analyzing module and the lifetime estimation training module. The database records a plurality of training data, wherein each of the training data includes operation activity information and a corresponding operation lifetime value. The storage device detecting and analyzing module collects the operation activity information corresponding to the storage devices. The lifetime estimation training module constructs a storage device lifetime predicting model according to the operation activity information and the corresponding operation lifetime value of each of the training data. The lifetime predicting module inputs the operation activity information of the storage devices to the storage device lifetime predicting model to generate a predicted lifetime value corresponding to each of the storage devices.

In an exemplary embodiment of the present invention, the lifetime estimation training module re-constructs the storage device lifetime predicting model according to the operation activity information and the predicted lifetime value of each of the storage devices.

In an exemplary embodiment of the present invention, when a first storage device among the storage devices is damaged, the storage device detecting and analyzing module records an actual lifetime value of the first storage device, and the lifetime estimation training module re-constructs the storage device lifetime predicting model according to the operation activity information and the actual lifetime value of the first storage device.

In an exemplary embodiment of the present invention, the storage device detecting and analyzing module includes a log collecting module and an operation activity identifying module, and in the operation of the storage device detecting and analyzing module collecting the operation activity information corresponding to the storage devices, the log collecting module collects at least one operation log corresponding to each of the storage devices, and the operation activity identifying module analyzes the at least one operation log of each of the storage devices to establish the operation activity information of each of the storage devices.

In an exemplary embodiment of the present invention, the at least one operation log comprises a system log, an application log, a database log and a self-monitoring analysis and report technical log.

In an exemplary embodiment of the present invention, the operation activity identifying module identifies system access errors from the system log, application access errors from the application log, database access errors from the database log and disk access errors in the S.M.A.R.T. log for each of the storage devices, calculates the number of the system access errors, the number of the application access errors, the number of the database access errors and the number of the disk access errors and establishes the operation activity information of each of the storage devices according to the number of the system access errors, the number of the application access errors, the number of the database access errors and the number of the disk access errors.

In an exemplary embodiment of the present invention, in the operation of the lifetime estimation training module constructing the storage device lifetime predicting model according to the operation activity information and the corresponding operation lifetime value of each of the training data, the lifetime estimation training module constructs the storage device lifetime predicting model by means of a K-means-clustering algorithm, a linear regression algorithm or a support vector machine (SVM).

In an exemplary embodiment of the present invention, in the operation of lifetime estimation training module constructing the storage device lifetime predicting model according to the operation activity information and the corresponding operation lifetime value of each of the training data, the lifetime estimation training module splits the training data and a plurality of predicting data composed of the operation activity information and the predicted lifetime value of each of the storage devices, into a plurality of data sets, constructs a plurality of sub predicting models respectively according to the data sets, and merges the sub predicting models to form the storage device lifetime predicting model.

According to an exemplary embodiment of the present invention, a storage device lifetime monitoring method for monitoring lifetimes of a plurality of storage devices is provided. The storage device lifetime monitoring method includes establishing a database recording a plurality of training data, wherein each of the training data includes operation activity information and a corresponding operation lifetime value; and collecting the operation activity information corresponding to the storage devices. The storage device lifetime monitoring method further includes constructing a storage device lifetime predicting model according to the operation activity information and the corresponding operation lifetime value of each of the training data; and inputting the operation activity information of the storage devices to the storage device lifetime predicting model to generate a predicted lifetime value corresponding to each of the storage devices.

In an exemplary embodiment of the present invention, the storage device lifetime monitoring method further includes re-constructing the storage device lifetime predicting model according to the operation activity information and the predicted lifetime value of each of the storage devices.

In an exemplary embodiment of the present invention, the storage device lifetime monitoring method further includes when a first storage device among the storage devices is damaged, recording an actual lifetime value of the first storage device; and re-constructing the storage device lifetime predicting model according to the operation activity information and the actual lifetime value of the first storage device.

In an exemplary embodiment of the present invention, the step of collecting the operation activity information corresponding to the storage devices includes collecting at least one operation log corresponding to each of the storage devices; and analyzing the at least one operation log of each of the storage devices to establish the operation activity information of each of the storage devices.

In an exemplary embodiment of the present invention, the storage device lifetime monitoring method further includes identifying system access errors from the system log, application access errors from the application log, database access errors from the database log and disk access errors in the S.M.A.R.T. log for each of the storage devices; calculating the number of the system access errors, the number of the application access errors, the number of the database access errors and the number of the disk access errors; and establishing the operation activity information of each of the storage devices according to the number of the system access errors, the number of the application access errors, the number of the database access errors and the number of the disk access errors.

In an exemplary embodiment of the present invention, the step of constructing the storage device lifetime predicting model according to the operation activity information and the corresponding operation lifetime value of each of the training data includes constructing the storage device lifetime predicting model by means of a K-means-clustering algorithm, a linear regression algorithm or an SVM.

In an exemplary embodiment of the present invention, the step of constructing the storage device lifetime predicting model according to the operation activity information and the corresponding operation lifetime value of each of the training data includes splitting the training data and a plurality of predicting data composed of the operation activity information and the predicted lifetime value of each of the storage devices into a plurality of data sets; constructing a plurality of sub predicting models respectively according to the data sets; and merging the sub predicting models to form the storage device lifetime predicting model.

To sum up, in the storage device lifetime monitoring system and the storage device lifetime monitoring method thereof provided by the present invention, the operation activity information corresponding to a plurality of storage devices can be identified, the lifetime of each storage device can be predicted according to the operation activity information of each storage device through the storage device lifetime predicting model, and the storage device lifetime predicting model can be further re-constructed according to predicting data composed of the operation activity information and the predicted lifetime of each storage device. Thereby, in the present invention, a great amount of training data with low cost can be produced to facilitate in enhancing the accuracy of predicting the lifetimes of the storage devices, so as to improve the efficiency of managing the storage devices.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
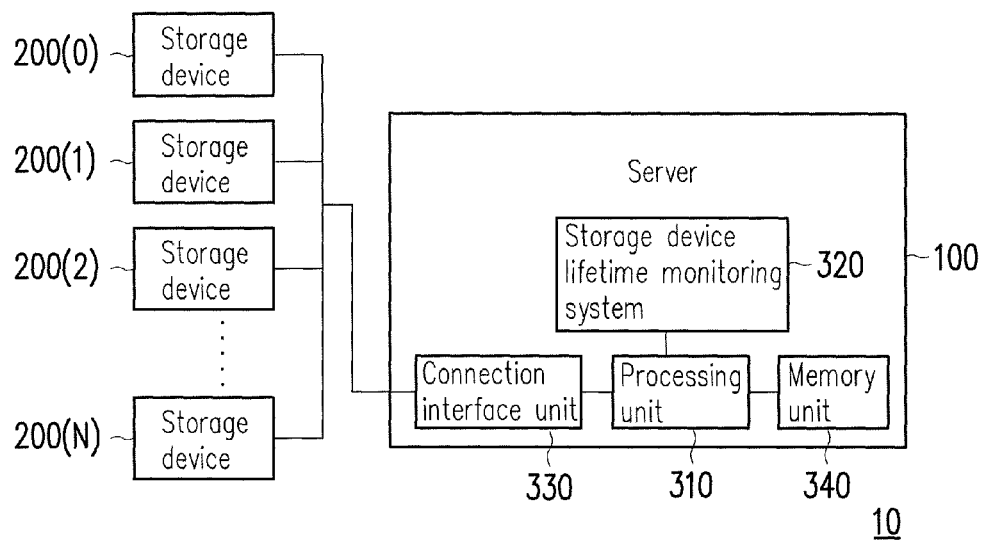
FIG. 1 is a schematic diagram illustrating a data center according to an exemplary embodiment.

FIG. 1 is a schematic diagram illustrating a data center according to an exemplary embodiment.

With reference to FIG. 1, in the present exemplary embodiment, a data center 10 includes a server 100 and a plurality of storage devices 200(0) to 200(N). The server 100 is coupled to storage devices 200(0) to 200(N), and configured to monitor device states of the storage devices 200(0) to 200(N). Specially, in the present exemplary embodiment, the server 100 monitors the device state and predicts a lifetime of each of the storage devices 200(0) to 200(N) by using a storage device lifetime monitoring system 320. It should be understood that the present invention is not intent to limit the number of the storage devices 200(0) to 200(N).

The storage devices 200(0) to 200(N) are configured to store data in the data center 10. For example, the stored data may include user data transmitted to the data center 10 by users, system data configured to manage the data center and backup data corresponding to the user data or the system data of the data center or data of any type adapted for being stored in the data center 10, which construes no limitations to the present invention. In the present exemplary embodiment, each of the storage devices 200(0) to 200(N) may be a hard disk drive (HDD) or a non-volatile memory storage device (SSD) of any type.

In the present exemplary embodiment, the server 100 is configured to not only monitor the lifetimes of the storage devices 200(0) to 200(N), but also control the allocation of the storage devices 200(0) to 200(N) in the data center 10. In the present exemplary embodiment, the server 100 includes a processing unit 310, a storage device lifetime monitoring system 320, a connection interface unit 330 and a memory unit 340.

The processing unit 310 is configured to control the overall operation of the server 100. In the present exemplary embodiment, The processing unit 310, for example, may be a central processing unit, a micro-processor or any other programmable microprocessor, a digital signal processor (DSP), a programmable controller, an application specific integrated circuit (ASIC), a programmable logic device (PLD) or the like. In the present exemplary embodiment, the processing unit 310 is a baseboard management controller (BMC), which is in charge of not only the overall operation of the server 100, but also monitoring internal information of the data center 10, such as a fan operation status, a temperature, or a voltage. Generally, the processing unit 310 may be directly integrated on a baseboard of the server 100 or disposed in a form of a card in the server 100.

The connection interface unit 330 is coupled to the processing unit 310, and the processing unit 310 may be connected to the storage devices 200(0) to 200(N) through the connection interface unit 330 to access data or issue commands. The connection interface unit 330 may comply with, for example, a serial attached SCSI (SAS) standard, a two-wire interface (TWI) standard, a serial advanced technology attachment (SATA) standard, a parallel advanced technology attachment (PATA) standard, an institute of electrical and electronic engineers (IEEE) 1394 standard, a peripheral component interconnect express (PCI Express) standard, a universal serial bus (USB) standard, an integrated device electronics (IDE) standard or any other physical interface complying with an adaptive standard, which is not limited in the present invention.

In the present exemplary embodiment, the storage device lifetime monitoring system 320 may include program codes or data stored in a storage unit coupled to the processing unit 310 and implements a function of monitoring the plurality of storage devices 200(0) to 200(N) in the data center 10. In the present exemplary embodiment, the storage unit may be, for example, a rewritable non-volatile memory, such as a hard disk drive (HDD), an erasable programmable read only memory (EPROM), an electrically erasable programmable read only memory (EEPROM) or a flash memory, or a circuit with a data storage capability. It should be noted that the storage unit is also configured to store other data of the server 100, e.g., a firmware or a software for managing the server 100 itself.

The memory unit 340 is coupled to the processing unit 310, and configured to temporarily store data of the server 100. In the present exemplary embodiment, the memory unit 340 may be, for example, a volatile memory, such as a dynamic random access memory (DRAM) or a static random access memory (SRAM). In the present exemplary embodiment, to implement the functions of the storage device lifetime monitoring system, when the server 100 is powered on, the processing unit 310 reads the program codes from the storage device lifetime monitoring system 320, loads the read program codes to the memory unit 340, executes the program codes perform a plurality of functions of the server 100. In other words, the processing unit 310 executes the program codes to perform a storage device lifetime monitoring method used by the server 100.

Figure 2:
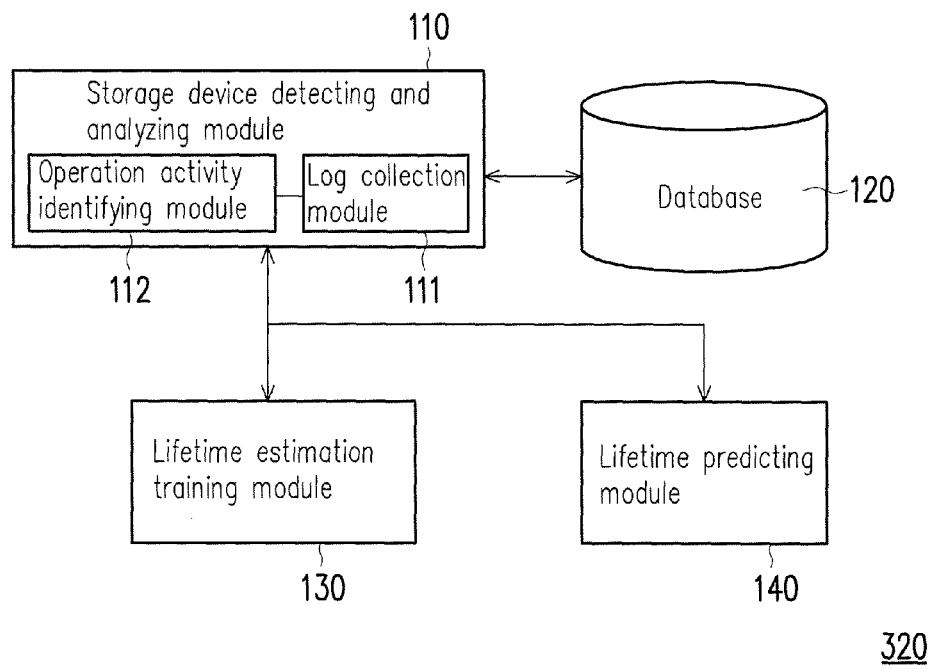
FIG. 2 is a schematic diagram illustrating a relation among program codes of the storage device lifetime monitoring system according to an exemplary embodiment.

FIG. 2 is a schematic diagram illustrating a relation among program codes of the storage device lifetime monitoring system according to an exemplary embodiment. The functions of program codes and a database stored in the storage device lifetime monitoring system 320 and interactive relations among them will be described with reference to FIG. 2 hereinafter With reference to FIG. 2, the storage device lifetime monitoring system 320 includes program codes and a database 120 for performing a storage device lifetime monitoring method. In the present exemplary embodiment, the program codes include a storage device detecting and analyzing module 110, a lifetime estimation training module 130 and a lifetime predicting module 140.

The storage device detecting and analyzing module 110 is configured to collect operation activity information corresponding to the storage devices 200(0) to 200(N). In an exemplary embodiment, the storage device detecting and analyzing module 100 includes a log collecting module 111 and an operation activity identifying module 112.

The log collection module 111 collects at least one operation log corresponding to each storage device. To be specific, in the present exemplary embodiment, when each storage device performs any operation, information with respect to the currently performed operation is recoded in the operation log. For instance, if it is assumed that a storage device performs a read operation, the storage device records any information with respect to the data reading operation, such as the start time, the end time and the size and an address of target data and whether an error occurs during the data reading operation, in an operation log corresponding to the data reading operation. In the present exemplary embodiment, a manner for the log collecting module 111 collecting the at least one operation log corresponding to each storage device may be, for example, that the processing unit 310 reads the recorded operation log from the storage device, and inputs the operation log into the log collection module, but the present invention is not limited thereto. For example, the log collecting module 111 may actively send a request to the storage device to obtain the operation log.

In the present exemplary embodiment, the operation log includes a system log, an application log, a database log and a self-monitoring analysis and report technical log (S.M.A.R.T. log). The system log records information with respect to the operation system operated with the storage devices 200(0) to 200(N). The application log records information with respect to operations of an application accessing the storage devices 200(0) to 200(N). The database log records information with respect to operations of a client terminal accessing the database stored in the storage devices 200(0) to 200(N). The S.M.A.R.T. log records self-monitoring and analyzing technical information corresponding to the storage devices among the storage devices 200(0) to 200(N) which belong to HDDs.

In the present exemplary embodiment, the operation activity identifying module 112 is configured to analyze the operation log corresponding to the each storage device to establish the operation activity information of each storage device. To be specific, the operation activity identifying module 112 identifies system access errors from the system log, application access errors from the application log, database access errors from the database log and disk access errors from the S.M.A.R.T. log for each storage device. Additionally, the operation activity identifying module 112 also calculates the number of the system access errors, the number of the application access errors, the number of the database access errors and the number of the disk access errors corresponding to each storage device and establishes the operation activity information of each storage device according to the number of the system access errors, the number of the application access errors, the number of the database access errors and the number of the disk access errors corresponding to each storage device.

For instance, if it is assumed that the log collection module 111 collects a system log, an application log, a database log and an S.M.A.R.T. log from the storage device 200(2). The operation activity identifying module 112 identifies 3 system access errors from the system log of the storage device 200(2), 30 application access errors from the application log of the storage device 200(2), 300 database access errors from the database log of the storage device 200(2) and 0 disk access error from the S.M.A.R.T. log of the storage device 200(2). The operation activity identifying module 112 establishes operation activity information of the storage device 200(2), e.g., the operation activity identifying module 112 records the operation activity information of the storage device 200(2) as "3, 30, 300, 0."

Moreover, if it is assumed that the log collection module 111 then further identifies 3 system access errors from the system log, 30 application access errors from the application log, 300 database access errors from the database log and 0 disk access error from the S.M.A.R.T. log which are collected from the storage device 200(2), the operation activity identifying module 112 updates the operation activity information of the storage device 200(2) as "6, 60, 600, 0." Namely, the operation activity identifying module 112 continuously updates the operation activity information of the storage device 200(2).

In the present exemplary embodiment, the storage device lifetime monitoring system 320 includes the database 120, in which the database 120 records a plurality of training data, and each training data includes operation activity information and a corresponding operation lifetime value. Here, one training data includes the operation activity information and the corresponding operation lifetime value recorded according to the usage status of the previously used storage device. Each training data corresponds to the information with respect to the previously used storage device. The description related to the operation activity information is set forth in detail above and will not be repeatedly described hereinafter. As for the corresponding operation lifetime value, it refers to a sum (also referred to as the lifetime) of an operation time period from a storage device being manufactured to being damaged. However, it should be understood that the present invention is not limited thereto. Manufacturers may design the definition of the corresponding operation lifetime value based on demands. A unit corresponding an operation lifetime value may be any suitable time unit, such as hour. For instance, if it is assumed that one of the training data is "0, 0, 0, 100, 50000," the training data may serve to indicate that the operation activity information of a certain storage device is "0, 0, 0, 100," and a lifetime of the storage device is 50000 hours. It should be noted that the aforementioned format of the training data is only an example for description, and construes no limitations to the present invention.

The lifetime estimation training module 130 is configured to train (i.e., construct) a storage device lifetime predicting model according to the operation activity information and the corresponding operation lifetime values of the training data. Furthermore, when designing the storage device lifetime monitoring system 320, a manufacturer may use operation activity information and an operation lifetime (which previously occur) of each storage device in an old data center (or another data center) as a plurality of training data and record the training data by using the database 120 of the storage device lifetime monitoring system 320, such that the lifetime estimation training module constructs the storage device lifetime predicting model according to the training data.

The lifetime predicting module 140 is configured to input the operation activity information of the storage devices 200(0) to 200(N) received from the storage device detecting and analyzing module 110 into the storage device lifetime predicting model constructed by the lifetime estimation training module 130 and generate a predicted lifetime value of each storage device. The overall concept of the storage device lifetime monitoring system of the present invention will be described with reference to FIG. 3 hereinafter.

Figure 3:
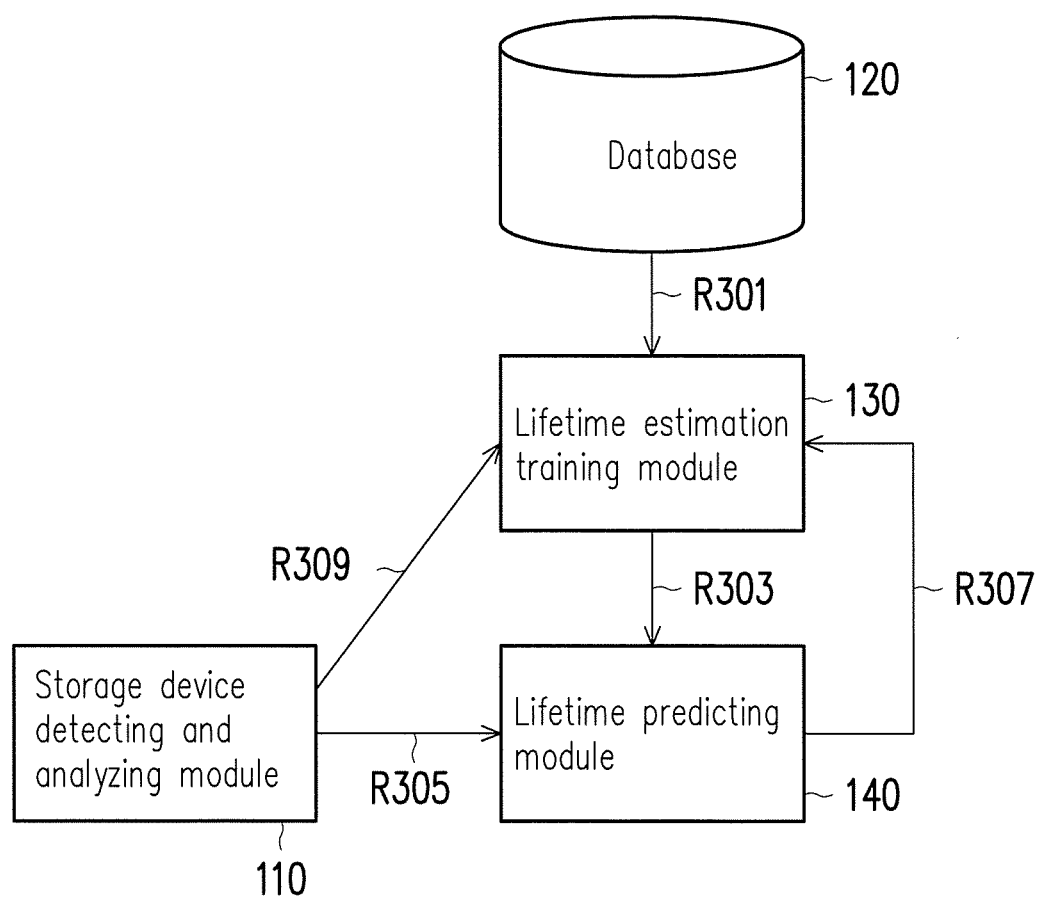
FIG. 3 is a schematic diagram illustrating the operation of constructing the storage device lifetime predicting model by using training data, predicting data and actual data according to an exemplary embodiment.

FIG. 3 is a schematic diagram illustrating the operation of constructing the storage device lifetime predicting model by using training data, predicting data and actual data according to an exemplary embodiment.

First, in the present exemplary embodiment, the processing unit 310 inputs the training data from the database 120 of the storage device lifetime monitoring system 320 to the lifetime estimation training module 130 to construct a storage device lifetime predicting model (i.e., path R301). The lifetime estimation training module 130 provides the constructed storage device lifetime predicting model to the lifetime predicting module 140 (i.e., path 303). The constructed storage device lifetime predicting model may be configured to predict the lifetimes of the storage devices 200(0) to 200(N) of the data center 10.

The storage device detecting and analyzing module 110 (instantly) collects the operation activity information of the storage devices 200(0) to 200(N) and inputs the operation activity information into the lifetime predicting module 140 (i.e., path R305).

The lifetime predicting module 140 inputs the received operation activity information of the storage devices 200(0) to 200(N) into the storage device lifetime predicting model to generate the predicted lifetime value of each storage device. To be specific, the lifetime predicting module 140 inputs the established corresponding operation activity information of each storage device into the constructed storage device lifetime predicting model to generate the corresponding predicted lifetime value of each storage device. The corresponding predicted lifetime value of each storage device indicates a sum of an operational time period corresponding to each storage device predicted by the storage device lifetime predicting model. For instance, if it is assumed that the operation activity information of the storage device 200(2) is "6, 60, 600, 0." The lifetime predicting module 140 inputs the operation activity information of the storage device 200(2) which is "6, 60, 600, 0" into the constructed storage device lifetime predicting model and generates a predicted lifetime value of "5000" (hours) corresponding to the operation activity information of "6, 60, 600, 0." In other words, in the condition that the operation activity information currently corresponding to the storage device 200(2) is "6, 60, 600, 0," the storage device lifetime predicting model predicts that the storage device 200(2) is capable of being operated for 5000 hours in total.

Then, the lifetime predicting module 140 transmits predicting data composed of the operation activity information and the predicted lifetime value of each storage device to the lifetime estimation training module 130 (i.e., path R307), to re-construct the storage device lifetime predicting model. To be specific, the storage device lifetime predicting model may be constructed by means of self-learning. For example, the lifetime predicting module 140 may also transmit a plurality of predicting data composed of the operation activity information and the predicted lifetime value of each storage device to the lifetime estimation training module 130 to re-construct the storage device lifetime predicting model. Thereby, the lifetime predicting module 130 may obtain a great amount data (i.e., the predicting data corresponding to each storage device) with low cost by means of self-learning to construct the storage device lifetime predicting model, so as to strengthen the predicting capability of the storage device lifetime predicting model. The self-learning mechanism of the present invention will be described in detail with reference to the drawings below.

In addition, when any storage device among the storage devices 200(0) to 200(N) is damaged, the storage device detecting and analyzing module 110 transmits actual data composed of the current operation activity information and an actual lifetime value of the damaged storage device to the lifetime estimation training module 130, so as to re-construct the storage device lifetime predicting model (i.e., path R309). For example, when a storage device (referred to as a first storage device hereinafter) among the storage devices is damaged, the storage device detecting and analyzing module 110 records an actual lifetime value of the first storage device and transmits actual data composed of operation activity information and the actual lifetime value of the first storage device to the lifetime estimation training module 130 to re-construct the storage device lifetime predicting model. In other words, when the first storage device is damaged, as described above, the storage device detecting and analyzing module 110 serves the operation activity information and the actual lifetime value of the first storage device as data for constructing to re-construct the storage device lifetime predicting model. Namely, the operation activity information and the operational (actual) lifetime value of each storage device which actually occur corresponding to the operation activity information the operation of each storage device may also be used to construct the storage device lifetime predicting model. Particularly, in another exemplary embodiment, the actual data may also be added into the database 120 for forming new training data.

In this way, the storage device lifetime monitoring system of the present exemplary embodiment is capable of providing a great amount of constructing data with low cost to construct the storage device lifetime predicting model, so as to enhance the accuracy of predicting the lifetime. It is to be mentioned that the mechanism of re-constructing the storage device lifetime predicting model maybe performed periodically or irregularly, which is not limited in the present invention. Functions of the components and interaction therebetween will be described in more detail with reference to the drawings hereinafter.

It is to be mentioned that in another exemplary embodiment, the server 100 may also perform a preventive operation according to the predicted lifetime value corresponding to the storage device 200(2) obtained through the storage device lifetime monitoring system 320. For instance, in this case, it is assumed that the storage device 200(2) is operated for 4900 hours, and the predicted lifetime value corresponding to the storage device 200(2) is 5000 hours. Since the operated time period of the storage device 200(2) is close to the predicted lifetime value, the server 100 may send an alert message. A maintenance technician of the data center 10 may perform a preventive operation on the storage device 200(2) according to the alert message. For example, the maintenance technician of the data center 10 may perform a data backup operation or a repair/replace operation on the storage device 200(2). Specially, after the data is backed up, the maintenance technician of the data center 10 may also perform a stress test on the storage device 200(2) to obtain the actual total operational time period (i.e., the actual lifetime value) of the storage device 200(2). As described above, after the actual lifetime value of the storage device 200(2) is obtained, the actual lifetime value and the operation activity information of the storage device 200(2) is transmitted to the lifetime estimation training module 130 to re-construct the storage device lifetime predicting model.

In the present exemplary embodiment, the lifetime estimation training module 130 constructs the storage device lifetime predicting model by means of a linear regression algorithm and the training data, but the present invention is not limited thereto. For example, in other exemplary embodiments, the lifetime estimation training module 130 may also construct the storage device lifetime predicting model by means of an algorithm adapted for machine learning, such as a K-means-clustering algorithm or a support vector machine (SVM).

It is to be mentioned that in another exemplary embodiment, a user may also input the training data simultaneously into storage device lifetime predicting models corresponding to a plurality of algorithms. After the construction is completed, a plurality of predicted lifetimes may be obtained by means of inputting operation activity information of a certain training data into the constructed storage device lifetime predicting models, and one of the storage device lifetime predicting models with the highest accuracy may be selected according to the obtained predicted lifetime.

Figure 4:
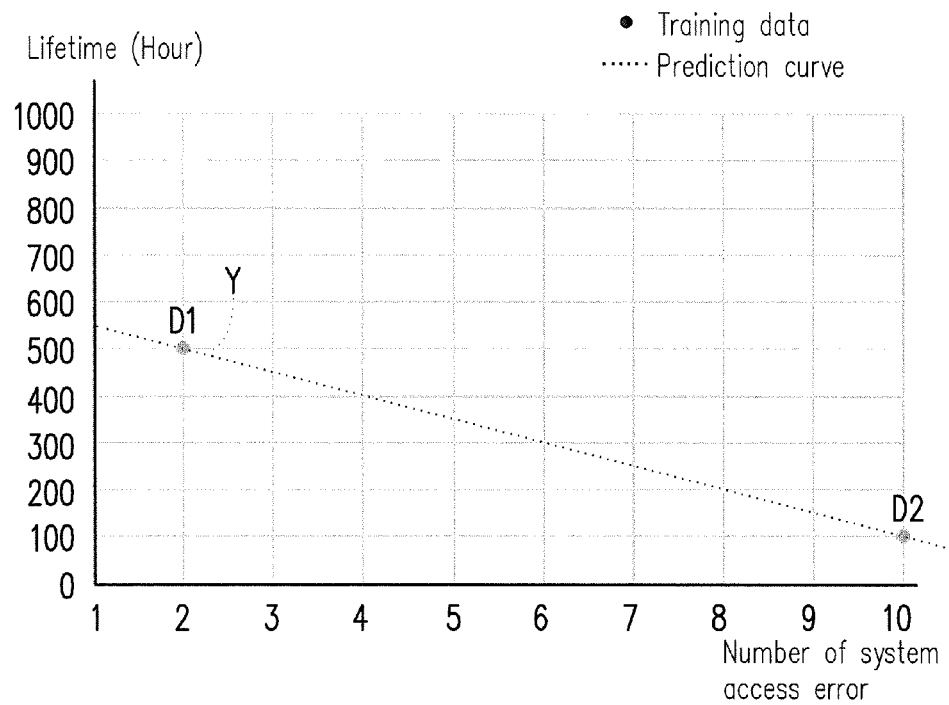
FIG. 4 and FIG. 5 are schematic diagrams of constructing the storage device lifetime predicting model according to an exemplary embodiment.
Figure 5:
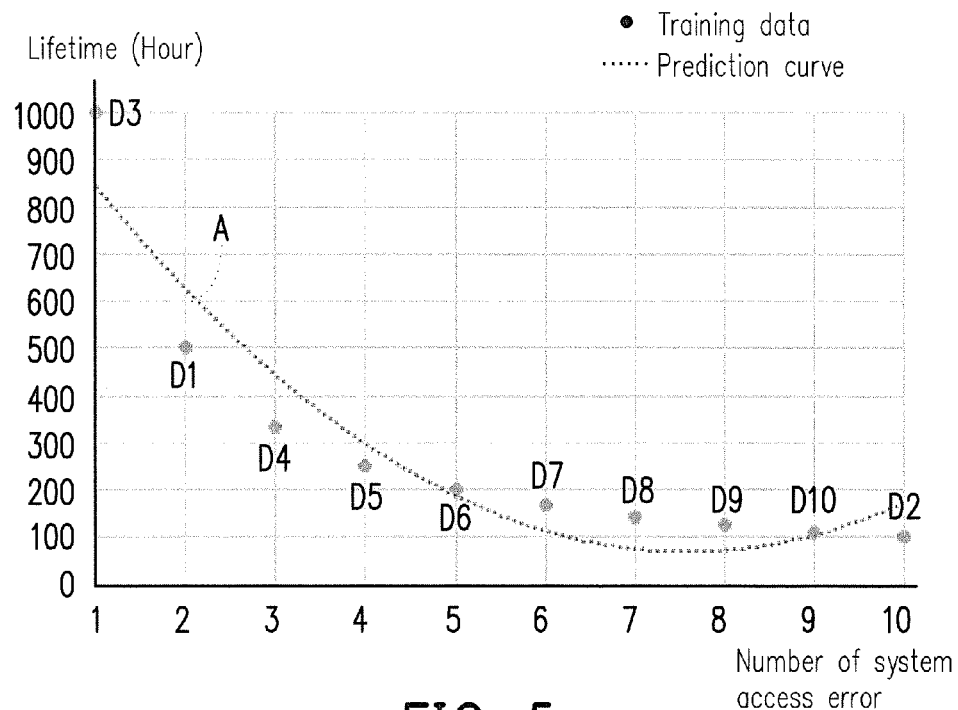

FIG. 4 and FIG. 5 are schematic diagrams of constructing the storage device lifetime predicting model according to an exemplary embodiment.

In order to simplify the description, it is assumed that each training data (e.g., dots D1 and D2 illustrated in FIG. 4, FIG. 5) includes the number of the system access errors and operation lifetime value corresponding to the number of the system access errors. The storage device detecting and analyzing module 110 only collects the system log of each storage device, calculates the system access errors of each storage device to establish variable operation activity information (i.e., the number of the system access errors) corresponding to each storage device. The storage device lifetime predicting model is constructed by means of the linear regression algorithm using the training data. In the present exemplary embodiment, the constructed storage device lifetime predicting model generates a prediction curve (e.g., dotted lines illustrated in FIG. 4 and FIG. 5) of a linear equation in two variables to predict the predicted lifetime value of each storage device.

With reference to FIG. 4, the horizontal axis represents the number of the system access errors, and the vertical axis represents the lifetime (i.e., a fulltime lifetime cycle in hours, of which the unit is hour) of each storage device. For instance, it is assumed that the storage device lifetime predicting model is constructed by means of the linear regression algorithm, and two sets of training data D1 and D2 are inputted into the storage device lifetime predicting model in the beginning. A value of the training data D1 is "2, 500," which represents a storage device having 2 system access error and a lifetime of 500 hours. Similarly, a value of the training data D2 is "10, 100," which represents a storage device having 10 system access error and a lifetime of 100 hours. The storage device lifetime predicting model generates a dualistic prediction curve Y (e.g., the dotted line illustrated in FIG. 4) according to the linear regression algorithm and the training data D1 and D2.

With reference to FIG. 5, for instance, it is assumed that other training data D3 to D10 is further input into the storage device lifetime predicting model illustrated in FIG. 4. The storage device lifetime predicting model generates a dualistic prediction curve A (e.g., the dotted line illustrated in FIG. 5) according to the linear regression algorithm and the training data D1 to D10. The process where different prediction curves are generated due to different training data being input may be considered as a process where the construction of the storage device lifetime predicting model continuously varies with the used algorithm and the input training data. In addition, the manufacturer may determine whether the construction of the storage device lifetime predicting model is completed under a predetermined condition. For example, referring to FIG. 5, the manufacturer may set that after 10 sets of training data D1 to D10 are input into the storage device lifetime predicting model, the prediction curve A generated by the storage device lifetime predicting model may indicate the completed construction of the storage device lifetime predicting model. Thereafter, the completely constructed storage device lifetime predicting model may be used to predict the lifetime of each storage device.

Figure 6:
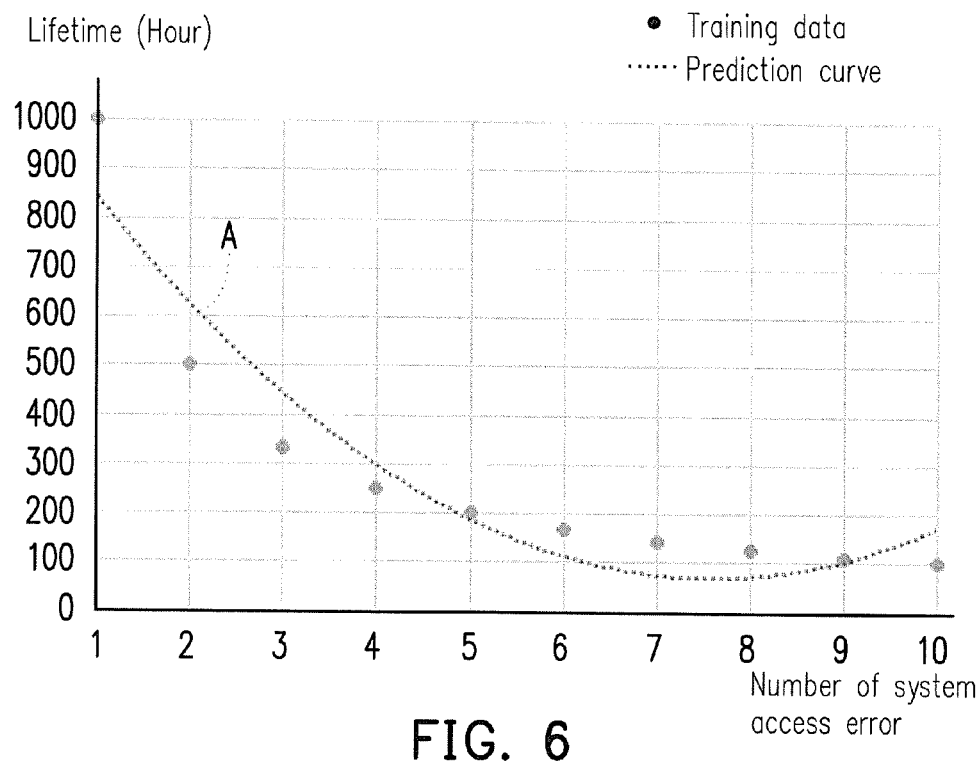
FIG. 6 and FIG. 7 are schematic diagrams illustrating a self-learning method according to an exemplary embodiment.
Figure 7:
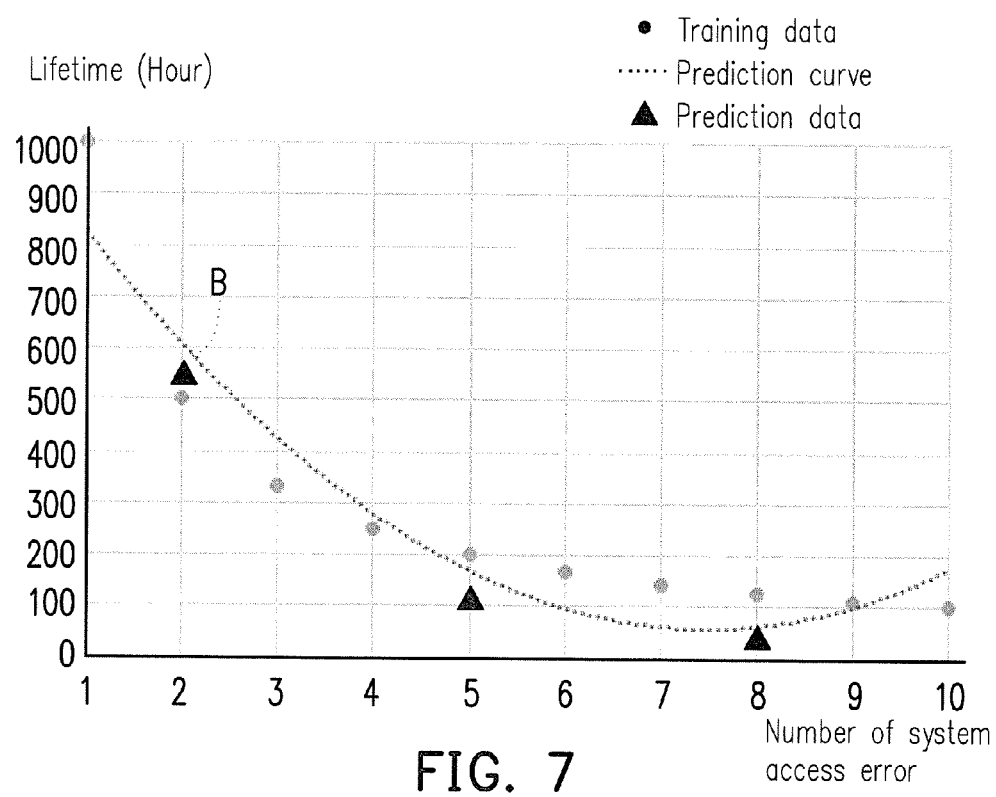

FIG. 6 and FIG. 7 are schematic diagrams illustrating a self-learning method according to an exemplary embodiment. In order to simplify the description, the method of constructing the storage device lifetime predicting model used in FIG. 6 and FIG. 7 is the same as the method of constructing the storage device lifetime predicting model used in FIG. 4 and FIG. 5 and thus, will not repeated hereinafter.

With reference to FIG. 6, for instance, it is assumed that the completely constructed storage device lifetime predicting model generates the dualistic prediction curve A (which is presented as the dotted line illustrated in FIG. 6), and the storage devices 200(0), 200(1) and 200(2) respectively have 2, 5 and 8 system access errors. The storage device detecting and analyzing module 110 correspondingly establishes the operation activity information of the storage devices 200(0), 200(1) and 200(2) as "2," "5" and "8." The lifetime predicting module inputs the operation activity information (the numbers of the system access errors) of the storage devices into the storage device lifetime predicting model. The storage device lifetime predicting model uses the prediction curve A and the numbers of the system access errors (i.e., "2," "5" and "8") to generate the predicted lifetime values, "550," "115" and "40" to respectively indicate the predicted lifetimes of the storage devices 200(0), 200(1) and 200(2). Namely, the operation activity information the predicted lifetime values corresponding to the storage devices 200(0), 200(1) and 200(2) respectively constructs predicting data "2, 550," "5, 115" and "8, 40" corresponding to the storage devices 200(0), 200(1) and 200(2). Then, the lifetime predicting module 140 transmits the predicting data (i.e., "2, 550," "5, 115" and "8, 40") to the lifetime estimation training module 130 to re-construct the storage device lifetime predicting model.

With reference to FIG. 7, after being re-constructed by using the predicting data (e.g., triangle points, "2, 550," "5, 115" and "8, 40," illustrated in FIG. 7), the storage device lifetime predicting model generates a new prediction curve B. The prediction curve B generated by using the predicting data for the re-construction (i.e., self-learning) may be used to predict the lifetimes of the storage devices. For instance, in case the storage device 200(N) encounters 4 system access errors, the storage device lifetime predicting model obtains the predicted lifetime value of the storage device 200(N), which is 275 hours, according to the prediction curve B and the number of the system access errors, 4, of the storage device 200(N).

Referring to FIG. 6 again, if the storage device 200(N) encounters the $4^{th}$ system access error, the storage device lifetime predicting model obtains the predicted lifetime value of the storage device 200(N), which is "300" (hours), according to the prediction curve A and the number of the system access errors, "4," of the storage device 200(N). The training data among the plurality of training data corresponding to the number of the system access errors, "4," has the corresponding operation lifetime value of "250" (hours), and in the condition that the corresponding number of the system access errors is also "4," the predicted lifetime value "300" predicted according to the prediction curve B is much closer to the training data (i.e., "250") than the predicted lifetime value "275" predicted according to the prediction curve A. Accordingly, prediction according to the prediction curve B has higher accuracy than prediction according to the prediction curve A. Namely, the self-learning method of re-constructing the storage device lifetime predicting model by using the predicting data indeed can contribute to the prediction accuracy of the storage device lifetime predicting model.

In the examples illustrated in FIG. 4 through FIG. 7, the storage device lifetime predicting model performs the construction according to the training data having two variables (which is also referred to 2-dimensional training data), where one of the variables is corresponding to the system access errors of each storage device, and the other variable is corresponding to the lifetime of each storage device. However, it should be noted that the present invention is not intent to limit dimensions (i.e., the variables) of the data, such as the training data, the predicting data or the actual data, for constructing the storage device lifetime predicting model. For example, in another exemplary embodiment, besides the necessary data dimensions (i.e., the lifetime of each storage device), the dimensions of the data for constructing the storage device lifetime predicting model may also include one of or a combination of the number of the application access errors, the number of the database access errors and the number of the disk access errors, or any other adaptive error types corresponding to the storage device operation activities. Additionally, the number of the variable types included in the data for constructing the storage device lifetime predicting model may also be equal to or more than 2. In other words, the number of the dimensions of the data for constructing the storage device lifetime predicting model may be two or more.

It is to be mentioned that since the amount of the training data or predicting data for constructing the storage device lifetime predicting model is large, in an exemplary embodiment, the lifetime estimation training module 130 may accelerate the construction of the storage device lifetime predicting model by using a split-and-merge method (e.g., a Hadoop MapReduce algorithm).

Figure 8:
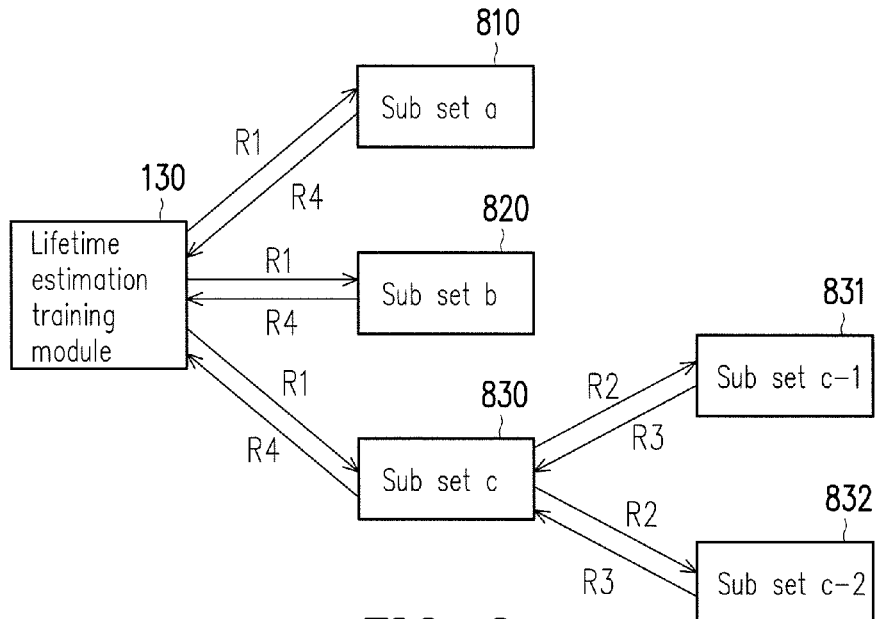
FIG. 8 is a schematic diagram illustrating the operation of constructing the storage device lifetime predicting model by using the training data and the predicting data according to an exemplary embodiment.

FIG. 8 is a schematic diagram illustrating the operation of constructing the storage device lifetime predicting model by using the training data and the predicting data according to an exemplary embodiment.

With reference to FIG. 8, in the present exemplary embodiment, the lifetime estimation training module 130 splits the training data and the predicting data (also referred to as a primary data set) into a plurality of data sets (e.g., sub sets a, b and c illustrated in FIG. 8), and transmits the sub sets a, b and c (810, 820 and 830) respectively to a plurality of cluster computing servers (i.e., path R1). Particularly, each cluster computing server may further split the received sub sets into other sub sets and transmit the split sub sets to other cluster computing servers. For example, the cluster computing server 830 splits the sub set c into sub sets c-1 and c-2 and transmits the sub sets c-1 and c-2 respectively to the cluster computing servers 831 and 832 (i.e., path R2). It should be noted that the primary data set may also include the actual data.

Then, the cluster computing servers construct a plurality of sub predicting models respectively according to the received sub sets and return the sub predicting models to the lifetime estimation training module 130. Referring to FIG. 8, the cluster computing servers 831 and 832 constructs a plurality of sub predicting models respectively according to the received sub sets c-1 and c-2 and return the sub predicting models to the lifetime estimation training module 130 (i.e., path R3). The cluster computing server 830 waits and receives the plurality of sub predicting models respectively returned by the cluster computing servers 831 and 832 to the cluster computing server 830. After the sub predicting models are received, the cluster computing server 830 merges the sub predicting models and returns the merged sub predicting models to the lifetime estimation training module 130 (i.e., path R4). Similarly, the cluster computing server 810, 820 also constructs a plurality of sub predicting models according to the received sub sets a and b, and returns the sub predicting models to the lifetime estimation training module 130 (i.e., path R4). After receiving the trained sub predicting models from the cluster computing servers 810, 820 and 830, the lifetime estimation training module 130 merges the sub predicting models to form the storage device lifetime predicting model. In this way, by means of the split-and-merge method, the data in a great amount may be split into sub data sets in a smaller amount, which are independently computed (i.e., a plurality of sub predicting models are constructed), and after the construction is completed, results (i.e., the sub predicting models) are merged to form the storage device lifetime predicting model, so as to reduce resources and times for constructing the storage device lifetime predicting model.

It is to be mentioned that the storage device lifetime predicting model may also be initially trained by the manufacturer before being manufactured. Namely, in another exemplary embodiment, the storage device lifetime predicting model is initially constructed by using training data of a database before being manufactured. It is not necessary for the database 120 of the storage device lifetime monitoring system 320 to pre-store a great amount of training data to construct the storage device lifetime predicting model. However, it should be noted that the storage device lifetime monitoring system 320 still may add the actual data (i.e., the current operation activity information and the actual lifetime value of the damaged storage device among the storage devices 200(0) to 200(N)) obtained from the storage devices 200(0) to 200(N) of the data center 10 into the database 120 and input the obtained actual data into the lifetime estimation training module 130 to retrain the storage device lifetime predicting model.

Figure 9:
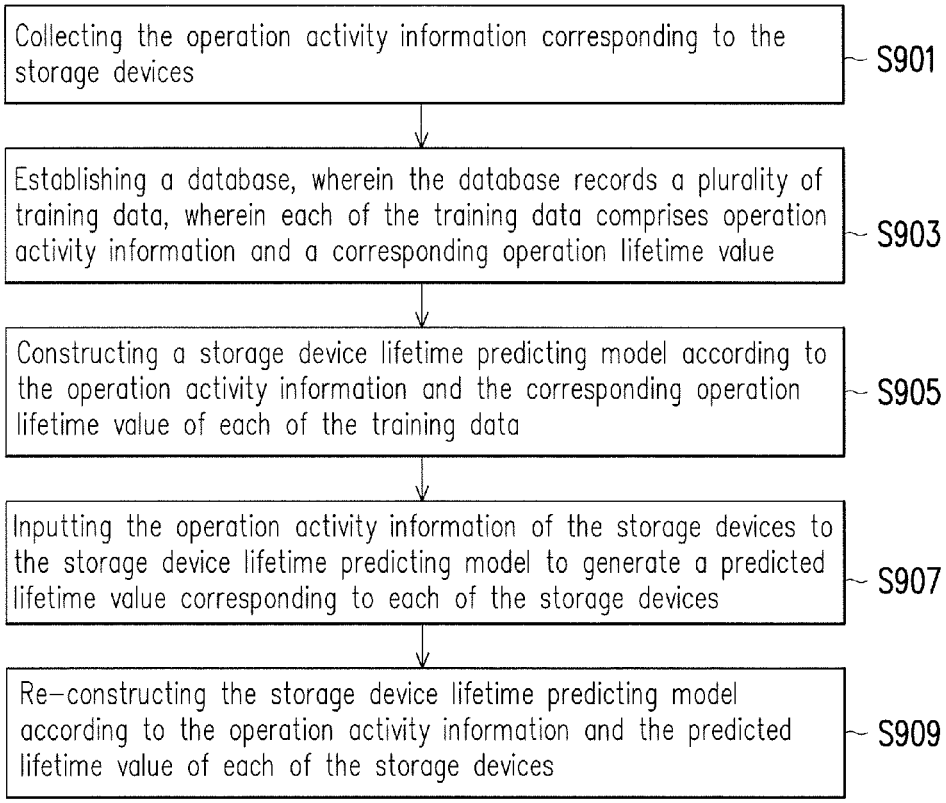
FIG. 9 is a flowchart of a storage device lifetime monitoring method according to an exemplary embodiment.

FIG. 9 is a flowchart of a storage device lifetime monitoring method according to an exemplary embodiment.

Referring to both FIG. 2 and FIG. 9, in step S901, the storage device detecting and analyzing module 110 collects the operation activity information corresponding to the storage devices 200(0) to 200(N).

In step S903, the storage device lifetime monitoring system 320 establishes the database, where the database records a plurality of training data, and each training data includes the operation activity information and the corresponding operation lifetime value.

In step S905, the lifetime estimation training module 130 constructs a storage device lifetime predicting model according to the operation activity information and the corresponding operation lifetime value of each training data.

In step S90, the lifetime predicting module 140 inputs the operation activity information of the storage devices 200(0) to 200(N) into the storage device lifetime predicting model to generate the corresponding predicted lifetime value corresponding to each storage device.

In step S909, the lifetime predicting module also reconstructs the storage device lifetime predicting model according to a plurality of predicting data composed of the operation activity information and the predicted lifetime value of each storage device. In this way, the storage device lifetime monitoring method of the present exemplary embodiment constructs storage device lifetime predicting model by using not only the training data but also the predicting data. Thereby, the efficiency of constructing the storage device lifetime predicting model can be dramatically improved, so as to improve the prediction accuracy.

It is to be mentioned that in the present exemplary embodiment, the functions of the storage device detecting and analyzing module 110, the lifetime estimation training module 130, the lifetime predicting module 140 are implemented in the form of program codes or software, but the present invention is not limited thereto. In another exemplary embodiment, the storage device detecting and analyzing module 110, the lifetime estimation training module 130, the lifetime predicting module 140 may also be implemented by using hardware circuits (e.g., circuit units). For example, the storage device lifetime monitoring system 320 may include a storage device detecting and analyzing circuit unit configured to implement the function of the storage device detecting and analyzing module 110, a lifetime estimation training circuit unit configured to implement the function of the lifetime estimation training module 130, a lifetime predicting circuit unit configured to implement the function of the lifetime predicting module 140 and a storage circuit unit configured to implement the function of the database storing or recording the training data, the actual data and the predicting data.

In light of the foregoing, the storage device lifetime monitoring system and the storage device lifetime monitoring method thereof provided by the present invention can identify the operation activity information corresponding to a plurality of storage devices, predict the lifetime of each storage device by means of the storage device lifetime predicting model according to the operation activity information of the storage devices, and further re-construct the storage device lifetime predicting model according to a plurality of predicting data composed of the operation activity information and the predicted lifetime of each storage device. Thereby, in the present invention, a great amount of training data with low cost can be produced to facilitate in enhancing the accuracy of predicting the lifetimes of the storage devices, so as to improve the efficiency of managing the storage devices.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A storage device lifetime monitoring system for monitoring lifetimes of a plurality of storage devices, the storage device lifetime monitoring system comprising:
    a storage device detecting and analyzing circuit;
    a database coupled to the storage device detecting and analyzing circuit;
    a lifetime estimation training circuit coupled to the storage device detecting and analyzing circuit; and
    a lifetime predicting circuit coupled to the storage device detecting and analyzing circuit and the lifetime estimation training circuit,
    wherein the database records a plurality of training data, wherein each of the training data comprises training operation activity information and a corresponding training lifetime value, wherein the training operation activity information of each of the training data is an amount of training access errors,
    wherein the storage device detecting and analyzing circuit collects current operation activity information of each of the storage devices, and the collected current operation activity information comprises a current amount of access errors of the corresponding storage device,
    wherein the lifetime estimation training circuit constructs, according to a plurality of amounts of training access errors and the plurality of corresponding training lifetime values in the plurality of the training data, a storage device lifetime predicting model, wherein the storage device lifetime predicting model generates a prediction curve, wherein each point of the prediction curve indicates a mapping relation between an amount of access errors and a predicted lifetime value corresponding to the amount of access errors,
    wherein the lifetime predicting circuit identifies a first current amount of access errors of a first storage device among the storage devices according to the first current operation activity information of the first storage device, and uses the prediction curve and the first current amount of access errors to generate a first predicted lifetime value corresponding to the first current amount of access errors according to the storage device lifetime predicting model,
    wherein the storage device detecting and analyzing circuit identifies a first current total operated duration of the first storage device, wherein the first current total operated duration is a time accumulated when the first storage device is operated,
    wherein the first predicted lifetime value is a limit value of the first current total operated duration of the first storage device when the first storage device has the first current amount of access errors,
    wherein when the current amount of access errors of the first storage device is changed from the first current amount of access errors to a second current amount of access errors, the lifetime predicting circuit uses the prediction curve and the second current amount of access errors to generate a second predicted lifetime value corresponding to the second current amount of access errors according to the storage device lifetime predicting model, and the limit value of the first current total operated duration of the first storage device is changed to the second predicted lifetime value, such that the limit value of the first current total operated duration of the first storage device is dynamically updated, by the lifetime predicting circuit, with the change of the current amount of access errors of the first storage device,
    wherein, when a difference between the first current total operated duration and the limit value of the first current total operated duration is less than a predetermined value, the storage device detecting and analyzing circuit sends a notification and performs a preventive operation on the first storage device for protecting the stored data in the first storage device,
    wherein when a first storage device among the storage devices is damaged, the storage device detecting and analyzing circuit records an actual lifetime value of the first storage device, wherein the lifetime estimation training circuit re-constructs the storage device lifetime predicting model according to the operation activity information and the actual lifetime value of the first storage device.

2. The storage device lifetime monitoring system according to claim 1, wherein the lifetime estimation training circuit re-constructs the storage device lifetime predicting model according to the operation activity information and the predicted lifetime value of each of the storage devices.

3. The storage device lifetime monitoring system according to claim 1, wherein the storage device detecting and analyzing circuit comprises a log collecting circuit and an operation activity identifying circuit, and
    in the operation of the storage device detecting and analyzing circuit collecting the operation activity information corresponding to the storage devices, the log collecting circuit collects at least one operation log corresponding to each of the storage devices, and the operation activity identifying circuit analyzes the at least one operation log of each of the storage devices to establish the operation activity information of each of the storage devices.

4. The storage device lifetime monitoring system according to claim 3, wherein the at least one operation log comprises a system log, an application log, a database log and a self-monitoring analysis and report technical log (S.M.A.R.T. log).

5. The storage device lifetime monitoring system according to claim 4, wherein the operation activity identifying circuit identifies system access errors from the system log, application access errors from the application log, database access errors from the database log and disk access errors in the S.M.A.R.T. log for each of the storage devices,
wherein the operation activity identifying circuit calculates the amount of the system access errors, the amount of the application access errors, the amount of the database access errors and the amount of the disk access errors,
wherein the operation activity identifying circuit establishes the operation activity information of each of the storage devices according to the amount of the system access errors, the amount of the application access errors, the amount of the database access errors and the amount of the disk access errors.

6. The storage device lifetime monitoring system according to claim 1, wherein in the operation of the lifetime estimation training circuit constructing the storage device lifetime predicting model according to the operation activity information and the corresponding operation lifetime value of each of the training data, the lifetime estimation training circuit constructs the storage device lifetime predicting model by means of a K-means-clustering algorithm, a linear regression algorithm or a support vector machine (SVM).

7. The storage device lifetime monitoring system according to claim 1, in the operation of lifetime estimation training circuit constructing the storage device lifetime predicting model according to the plurality of amounts of training access errors and the corresponding operation lifetime values in the plurality of the training data,
the lifetime estimation training circuit splits the training data and a plurality of predicting data composed of an amount of access errors and a predicted lifetime value of each of the storage devices into a plurality of data sets,
wherein the lifetime estimation training circuit constructs a plurality of sub predicting models respectively according to the data sets,
wherein the lifetime estimation training circuit merges the sub predicting models to form the storage device lifetime predicting model.

8. A storage device lifetime monitoring method, for monitoring lifetimes of a plurality of storage devices, the storage device lifetime monitoring method comprising:
establishing a database, wherein the database records a plurality of training data, wherein each of the training data comprises training operation activity information and a corresponding training lifetime value, wherein the training operation activity information of each of the training data is an amount of training access errors;
collecting current operation activity information of each of the storage devices, wherein the collected current operation activity information comprises a current amount of access errors of the corresponding storage device;
constructing, according to a plurality of amounts of training access errors and the plurality of corresponding training lifetime values in the plurality of the training data, a storage device lifetime predicting model, wherein the storage device lifetime predicting model generates a prediction curve, wherein each point of the prediction curve indicates a mapping relation between a amount of access errors and a plurality of lifetime value corresponding to the amount of access errors;
identifying a first current amount of access errors of a first storage device among the storage devices according to the first current operation activity information of the first storage device, and using the prediction curve and the first current amount of access errors to generate a first predicted lifetime value corresponding to the first current amount of access errors according to the storage device lifetime predicting model;
identifying a first current total operated duration of the first storage device, wherein the first current total operated duration is a time accumulated when the first storage device is operated;
wherein the first predicted lifetime value is a limit value of the first current total operated duration of the first storage device when the first storage device has the first current amount of access errors;
when the current amount of access errors of the first storage device is changed from the first current amount of access errors to a second current amount of access errors, using the prediction curve and the second current amount of access errors to generate a second predicted lifetime value corresponding to the second current amount of access errors according to the storage device lifetime predicting model, and the limit value of the first current total operated duration of the first storage device is changed to the second predicted lifetime value, such that the limit value of the first current total operated duration of the first storage device is dynamically updated, by the lifetime predicting circuit, with the change of the current amount of access errors of the first storage device;
when a difference between the first current total operated duration and the limit value of the first current total operated duration is less than a predetermined value, sending a notification and performing a preventive operation on the first storage device for protecting the stored data in the first storage device; and
when a first storage device among the storage devices is damaged, recording an actual lifetime value of the first storage device, and re-constructing the storage device lifetime predicting model according to the operation activity information and the actual lifetime value of the first storage device.

9. The storage device lifetime monitoring method according to claim 8, further comprising:
re-constructing the storage device lifetime predicting model according to the operation activity information and the predicted lifetime value of each of the storage devices.

10. The storage device lifetime monitoring method according to claim 8, wherein the step of collecting the operation activity information corresponding to the storage devices comprises:
collecting at least one operation log corresponding to each of the storage devices; and
analyzing the at least one operation log of each of the storage devices to establish the operation activity information of each of the storage devices.

11. The storage device lifetime monitoring method according to claim 10, wherein the at least one operation log comprises a system log, an application log, a database log and a S.M.A.R.T. log.

12. The storage device lifetime monitoring method according to claim 11, further comprising:
   identifying system access errors from the system log, application access errors from the application log, database access errors from the database log and disk access errors in the S.M.A.R.T. log for each of the storage devices;
   calculating the amount of the system access errors, the amount of the application access errors, the amount of the database access errors and the amount of the disk access errors; and
   establishing the operation activity information of each of the storage devices according to the amount of the system access errors, the amount of the application access errors, the amount of the database access errors and the amount of the disk access errors.

13. The storage device lifetime monitoring method according to claim 8, wherein the step of constructing the storage device lifetime predicting model according to the operation activity information and the corresponding operation lifetime value of each of the training data comprises:
   constructing the storage device lifetime predicting model by means of a K-means-clustering algorithm, a linear regression algorithm or an SVM.

14. The storage device lifetime monitoring method according to claim 8, wherein the step of constructing the storage device lifetime predicting model according to the plurality of amounts of training access errors and the plurality of corresponding operation lifetime values in the plurality of the training data comprises:
   splitting the training data and a plurality of predicting data composed of an amount of access errors and a predicted lifetime value of each of the storage devices into a plurality of data sets;
   constructing a plurality of sub predicting models respectively according to the data sets; and
   merging the sub predicting models to form the storage device lifetime predicting model.

* * * * *